United States Patent [19]

Volk

[11] Patent Number: 4,615,251

[45] Date of Patent: Oct. 7, 1986

[54] SABRE SAW BLADE FOLLOWER GUIDE

[76] Inventor: Michael J. Volk, 216 McKeon Rd., Severna Park, Md. 21146

[21] Appl. No.: 767,091

[22] Filed: Aug. 19, 1985

Related U.S. Application Data

[63] Continuation-in-part of Ser. No. 680,912, Dec. 11, 1984.

[51] Int. Cl.⁴ .............................................. B27B 11/02
[52] U.S. Cl. ....................................... 83/574; 30/392; 83/762; 83/823
[58] Field of Search ................. 83/761, 762, 574, 745, 83/823, 829; 30/392

[56] References Cited

U.S. PATENT DOCUMENTS

| | | | |
|---|---|---|---|
| 3,789,716 | 2/1974 | Pearl | 83/761 X |
| 4,096,777 | 6/1978 | Adams | 83/762 |
| 4,320,678 | 3/1982 | Volk | 83/574 |

Primary Examiner—Frank T. Yost
Attorney, Agent, or Firm—Brady, O'Boyle & Gates

[57] ABSTRACT

A follower guide for a sabre saw blade stabilizes the unsupported end portion of the blade during cutting operations, assuring a clean precision cut through the workpiece. Twisting, bending and other misalignment of the saw blade is eliminated. The follower guide is spring-urged into engagement with the saw blade and is constructed to coact with all standard sabre saw blades without requiring any modification thereof. The follower guide can be installed readily on various types of saw tables or platforms.

11 Claims, 7 Drawing Figures

SABRE SAW BLADE FOLLOWER GUIDE

CROSS-REFERENCE TO RELATED APPLICATION

This application is a continuation-in-part of prior copending application Ser. No. 06/680,912, filed Dec. 11, 1984, for SAW GUIDE AND MITER APPARATUS.

BACKGROUND OF THE INVENTION

Prior U.S. Pat. No. 4,320,678, issued Mar. 23, 1982, to Michael J. Volk, discloses in drawing FIGS. 12 through 16 a guide means for the unsupported end of a sabre saw blade which travels with the saw blade on its path of movement through a workpiece being cut by the blade. The guide means shown in two forms in the referenced prior patent is in the form of a small guide plate which traverses a pair of parallel rails attached to a power tool accessory table. In each disclosed form of the saw blade guide means, a special non-conventional sabre saw blade is required. In one form, the normally unsupported end of the saw blade is bifurcated and the body of the blade is wider than a standard type blade. In the second form, the unsupported end portion of the sabre saw blade comprises a toothless extension of the blade, causing it to be non-conventional.

The present invention has for a main objective to provide a follower guide for any standard or conventional sabre saw-type blade, thus obviating the necessity for manufacturing a special non-standard blade which is both costly and impractical.

The term "sabre saw" referred to herein is used only to describe the technique of operation of a saw blade with which the follower guide can be used. This invention may be used with any saw wherein one end of the saw blade is unsupported or cantilevered. Such saws are also referred to in the trade, for example, as jig saws.

Another object of the invention is to provide a follower guide for a sabre saw blade which is spring-urged into constant engagement with the rear toothless edge of the blade near its unsupported end so as to stabilize the saw blade in all directions during its passage through a wood piece being cut by the blade. The invention prevents twisting, bending and lateral displacement of the sabre saw blade and therefore assures a clean precision cut through a workpiece.

Another important object of the invention is to provide a sabre saw blade follower guide which is compatible with various types of saw table structures equipped with power tool guide means, with or without associated protractor means. The follower guide is in the form of an elongated blade element having a forward end saw blade guiding notch. The blade element can be installed flush with the workpiece support surface of a saw table or platform.

Still another object of the invention is to provide a spring-biased follower guide for a sabre saw blade which can be retracted and cocked in an inactive position relative to the sabre saw blade.

A further object is to provide a sabre saw blade follower guide of the mentioned character which can be utilized on a table structure equipped with sabre saw guide rails which are used in two different operating modes, raised and fixed or floating and resting on a workpiece, the present invention being compatible with either mode of use.

Other features and advantages of the invention will become apparent to those skilled in the art during the course of the following description.

DETAILED DESCRIPTION

Figure 1:
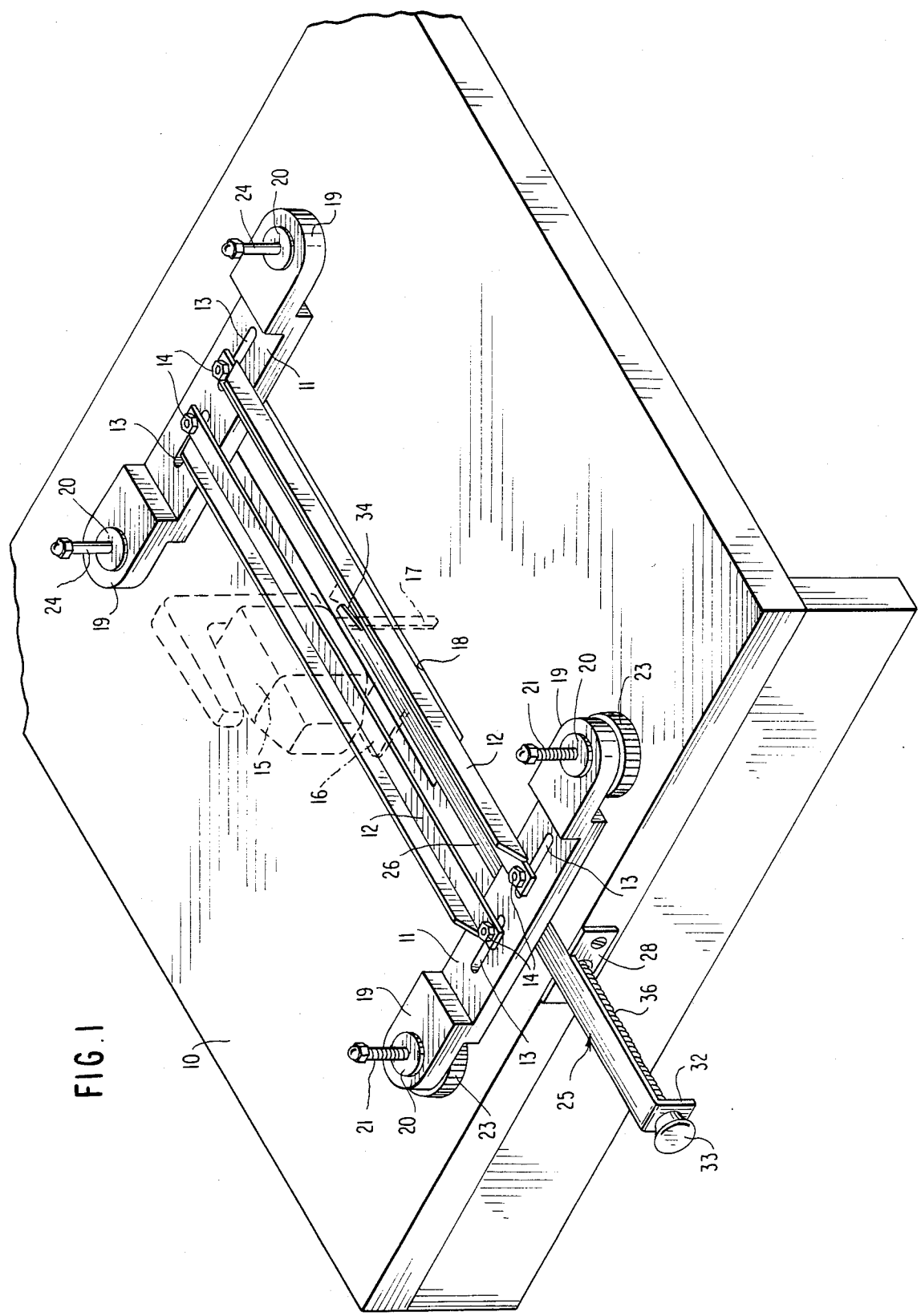
FIG. 1 is a perspective view of a sabre saw blade follower guide installed on a table having saw guide rails which can be used selectively in a floating mode or in a fixed elevated mode.

Referring to the drawings in detail wherein like numerals designate like parts, a portable power tool table 10 of the general type disclosed in U.S. Pat. No. 4,489,634 to Volk is illustrated. This table is equipped with a pair of support bars 11 for two elongated parallel power tool guide rails 12, which are laterally adjustable on the bars 11 by means of adjusting slots 13 in the bars 11 and cooperating fastener elements 14 at the ends of the guide rails 12 which are adjustable and lockable within the slots 13. The guide rails 12 can support and guide various portable power tools, such as a circular saw, router, or a sabre saw 15 shown in broken lines in FIGS. 1 and 3. The rails 12 are adjusted and locked to form a precision guideway for the sole plate 16 of the sabre saw.

The conventional reciprocating sabre saw blade 17 extends between the guide rails 12 and through a clearance slot 18 formed in the table 10.

The support bars 11 have end elevated extensions 19 which are apertured to receive unthreaded bushings 20 fixed within the apertures. The bushings on one support bar 11, FIG. 1, receive therethrough threaded guide rail height adjusting rods 21 which do not have threaded engagement with the bushings 20, the latter being freely movable along the threaded adjusting rods 21. The lower ends of the rods 21 are fixedly anchored to the table 10 by a lock nut means 22 shown in FIG. 2. Manually operated threaded adjusting nuts 23 are provided on the threaded rods 21 beneath the extensions 19, whereby corresponding ends of the sabre saw guide rails 12 can be raised and lowered relative to the workpiece support surface of the table 10.

Figure 2:
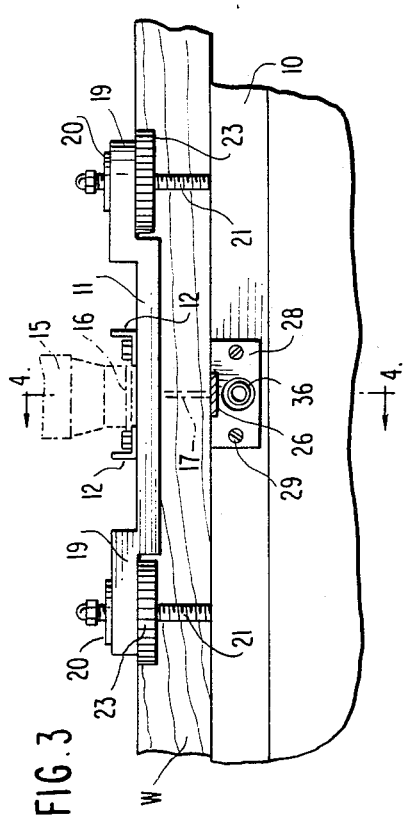
FIG. 2 is an end elevation, partly in cross section, showing the saw guide rails arranged in a floating mode relative to the table structure.

At the far ends of the rails 12, the bushings 20 receive unthreaded posts or rods 24 therethrough which are similarly anchored at their lower ends to the table 10, as shown at 22 in FIG. 2. There are no adjusting nuts associated with the unthreaded rods 24 which are simply guide rods for the adjacent support bar 11.

Figure 3:
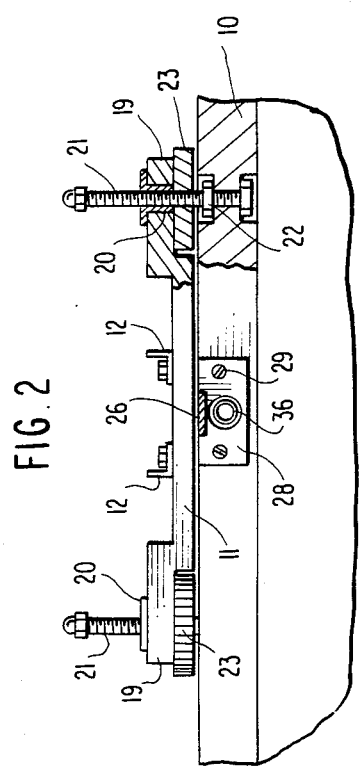
FIG. 3 is a similar view showing the guide rails in a fixed elevated mode.
Figure 4:
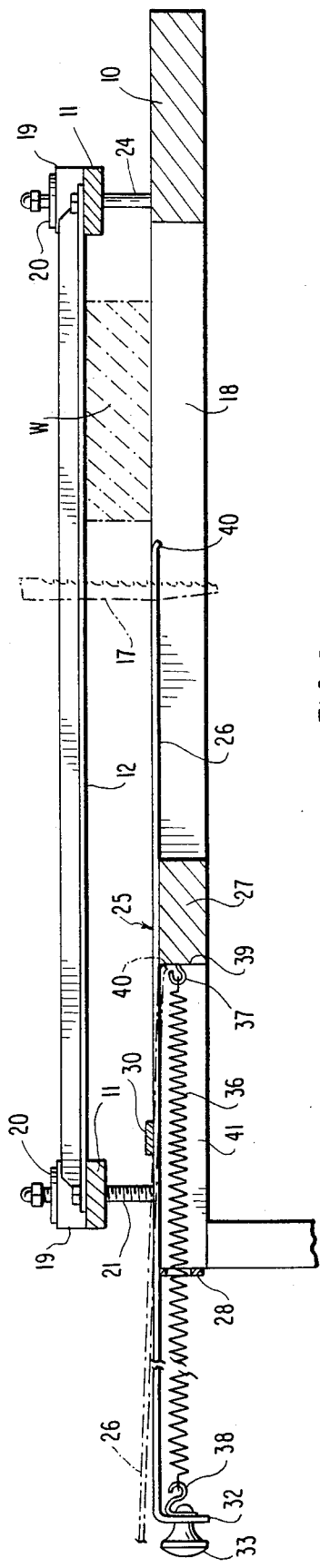
FIG. 4 is a longitudinal vertical section, partly in elevation, taken on line 4—4 of FIG. 3.

Substantially in accordance with U.S. Pat. No. 4,489,634, the guide rails 12 can be used in two different modes shown, respectively, in FIG. 2 and in FIGS. 3 and 4. In FIG. 2, the guide rails 12 are free-floating vertically on the rods 21 above the nuts 23, and the guide rails 12 rest upon any workpiece, not shown, placed on the table 10. In FIGS. 3 and 4, the rails 12 are in an elevated fixed mode relative to the table 10 and workpiece W on the table. The fixed elevation of the rails 12 and their support bars 11 is established by adjusting the nuts 23 upwardly on the threaded rods 21. In both modes of use, the portions of the rails 12 near the unthreaded rods 24 rest on the top of the workpiece W. Leveling of the rails 12 can always be accomplished by adjusting the nuts 23 on the threaded rods 21 which are more remote from the workpiece.

The sabre saw blade follower guide 25, forming the main subject matter of the present invention, is embodied in an elongated relatively thin constant width blade member 26, whose top face is arranged flush with the workpiece support surface of the table 10. A section 27 of the table 10, FIG. 4, is recessed in its top face to support the blade member 26 slidably in flush relationship with the top surface of the table. A guide plate 28 for the blade member 26 is fixed by screws 29 to the adjacent edge of the table 10 and is recessed in its top edge to slidably support the blade 26 in flush relationship with the top surface of the table. A strap member 30 secured by screws 31 to the table 10 extends across the blade member 26 between the supporting table section 27 and the guide plate 28. The strap member 30 prevents the thin somewhat resilient blade member 26 from rising off of its support surfaces during operation.

Figure 5:
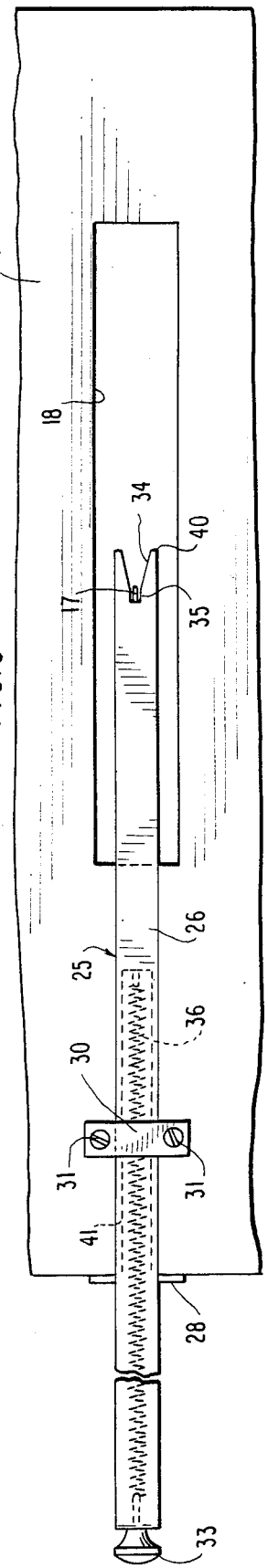
FIG. 5 is a fragmentary plan view of the follower guide with the saw guide rails and associated elements omitted.

At its rear end beyond the guide plate 28 and the adjacent edge of the table 10, the blade member 26 has a downturned extension 32 carrying a pulling knob 33 for the sabre saw blade follower guide 25. At its forward end, as best shown in FIG. 5, the blade member 26 is provided with a deep V-notch 34 leading to a central relatively narrow rectangular cross section notch or recess 35 which terminates somewhat rearwardly of the forward tip of the blade member 26. The notch or recess 35 receives and straddles the rear edge of the sabre saw blade 17 which is smooth and carries no saw teeth. The engagement of the saw blade 17 within the notch 35 near the unsupported end of the cantilevered saw blade stabilizes the latter during the sawing operation and prevents twisting, bending and lateral deflection of the blade relative to the workpiece being cut. The saw blade 17 reciprocates smoothly within the notch 35 and is constantly guided thereby during the sawing operation.

The blade member 26 is biased into contact with the rear of the saw blade 17 by a retractile spring 36 beneath the blade member 26 and having its opposite ends connected with hooks 37 and 38 on the table section 27 and extension 32, respectively, the spring 36 extending through an opening provided in the guide plate 28.

In the use of the portable sabre saw 15 on the table 10, the rails 12 are properly adjusted and locked to fit the width of the fabre saw sole plate 16. The rails 12 and their end support bars 11 can be placed in a floating mode on the rods 21 and 24 by lowering the nuts 23, FIG. 2, and a workpiece is placed beneath the rails 12 across the table slot 18 and somewhat near the support bar 11 engaged with the smooth unthreaded guide rods 24. The other ends of the rails 12 can be slightly adjusted to level the rails through use of the adjusting nuts 23.

Before the sabre saw 15 is placed on the guide rails 12, the saw blade follower guide 25 is retracted manually to a cocked position, described below, by use of the knob 33, stretching the spring 36. The sabre saw 15 is placed on the guide rails 12 and the knob 33 is used to release the blade follower guide from the cocked position. The spring 36 acts on the follower guide 25 to bring the notch 35 into engagement with the rear edge of the saw blade 17 to maintain it positively engaged with the saw blade 17 during the cutting of a workpiece. The follower guide works efficiently with all standard sabre saw blades, and no specially constructed blades are required. No guide track means for the blade member 26 is required on the table 10 except the plate 28 and the recessed top face of table section 27 and the hold-down strap 30. The follower guide is easy to install and is simplified and very reliable in operation. It may be cocked in the retracted position as shown in broken lines in FIG. 4 by placing the leading tip 40 of the blade member 26 behind the rear face 39 of table section 27. Preferably, the leading tip 40 of the follower guide is slightly downturned, FIG. 4, to enable the blade member 26 to slide smoothly under the workpiece W. Rearwardly of the section 27, the table 10 has another passage or slot 41 receiving the spring 36.

Figure 6:
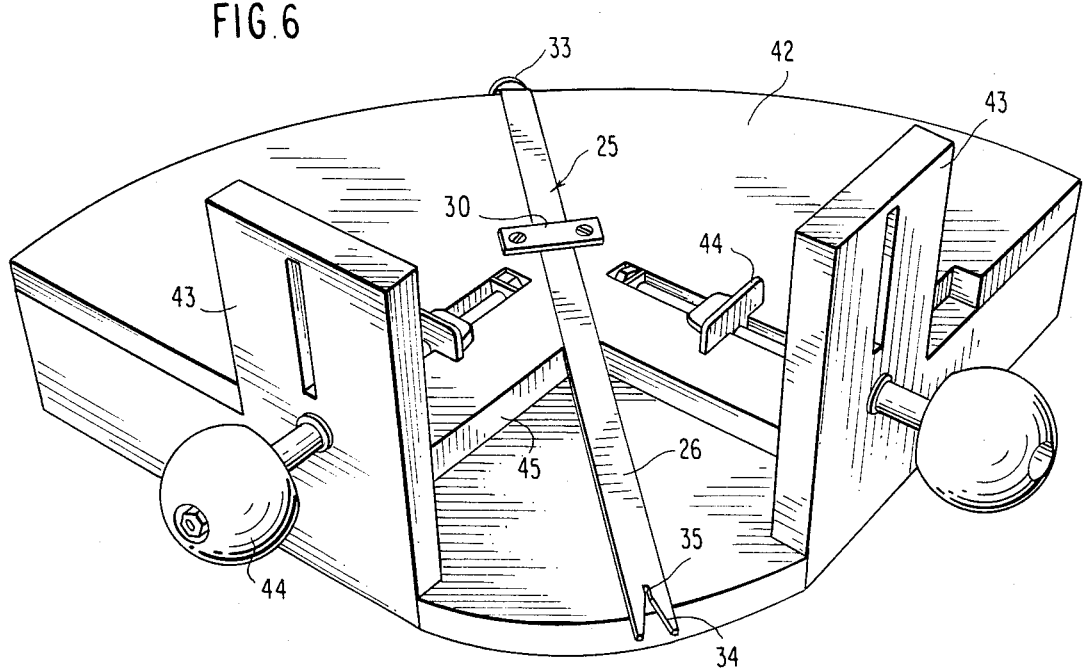
FIG. 6 is a perspective view showing the follower guide according to the invention installed on a mitering machine table structure.
Figure 7:
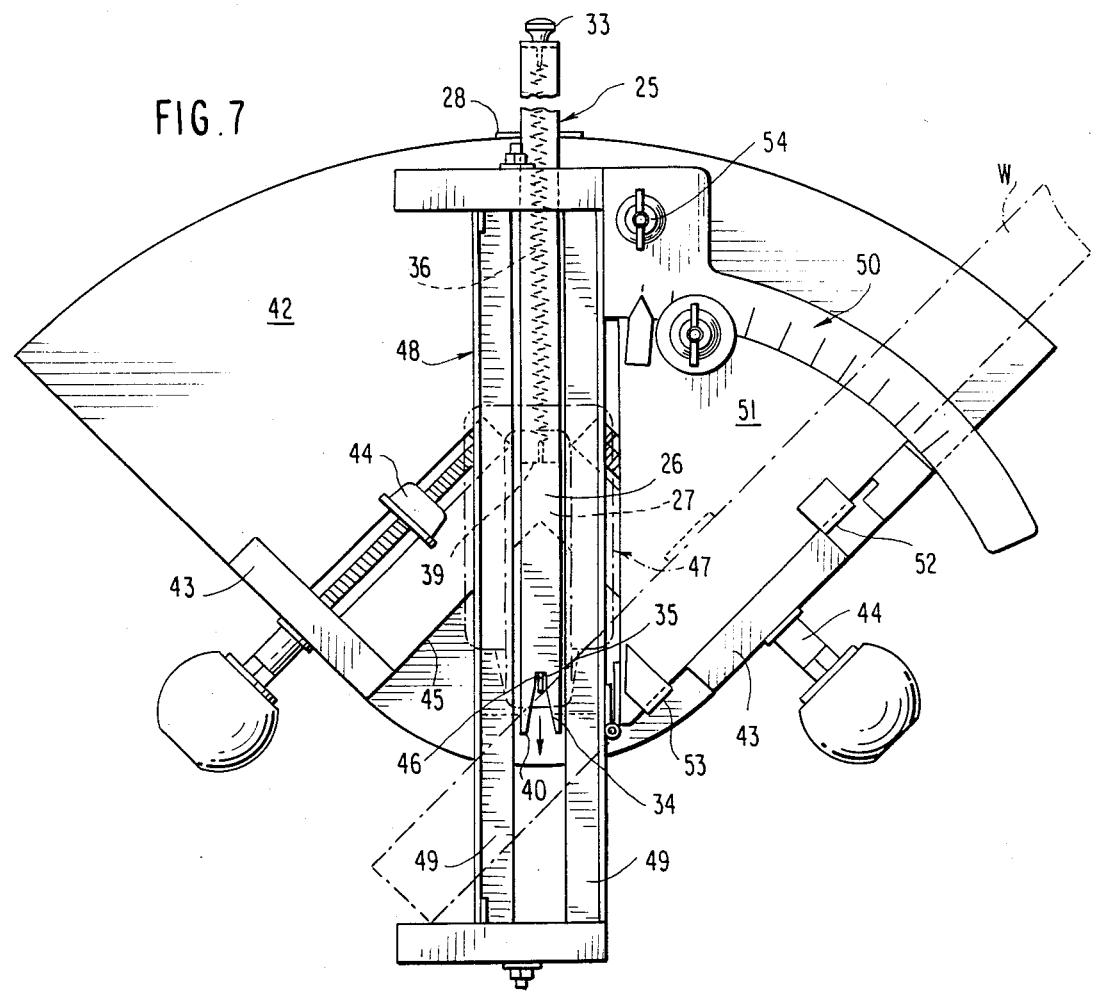
FIG. 7 is a similar view of the invention showing sabre saw guide rails and an associated protractor on the table structure of the mitering machine.

In FIGS. 6 and 7 of the drawings, the invention is applied to a mitering and framing machine of the type disclosed in pending application Ser. No. 06/680,912, filed Dec. 11, 1984 by Michael J. Volk, above-referenced. The machine includes a horizontal workpiece support table 42 and vertical workpiece fences 43 rising above the surface of table 42 and being spaced apart in perpendicular relationship in two vertical planes. The framing machine has two workpiece vises 44 provided thereon, as disclosed in the referenced patent application and the table 42 is cut away as at 45 between the fences 43 and vises to provide a working space for the vertical saw blade 46 of a sabre saw 47 shown in FIG. 7.

As best shown in FIG. 6, the sabre saw follower guide 25 is installed centrally on the table 42 in flush relationship with the table workpiece support surface in the manner fully described previously in connection with the structure shown in FIGS. 1-5. Referring to FIG. 7, a sabre saw guideway 48 including two spaced parallel guide rails 49 is provided for use on the table 42 in the manner fully disclosed in the above-referenced patent application. The saw guideway 48 carries an easily adjustable protractor 50 including a hinged sector plate 51 having spaced depending locator tabs 52 and 53 fixed thereto, as described in said application. These tabs can engage one longitudinal edge of a workpiece W, such as a frame member undergoing cutting, at a prescribed angle by the sabre saw blade 46. The sabre saw guideway 48 and attached protractor 50 may rest on the workpiece W while the latter is engaging the fence 43 and the tabs 52 and 53, as described in the pending patent application. An adjustable bolt 54 forms a support for the saw guideway 48 and protractor 50 near the end of the guideway remote from the workpiece and workpiece fences.

The use or operation of the invention as illustrated in FIGS. 6 and 7 is essentially identical to the operation described previously in connection with FIGS. 1-5. The saw guideway 48, being elevated from the workpiece support table 42, allows the blade member 26 of the follower guide 25 to engage the rear of the reciprocating saw blade 46 near its lower unsupported end, such blade being received in and stabilized by the slot 35 in the manner fully described previously.

The terms and expressions which have been employed herein are used as terms of description and not of limitation, and there is no intention, in the use of such terms and expressions, of excluding any equivalents of the features shown and described or portions thereof but it is recognized that various modifications are possible within the scope of the invention claimed.

I claim:

1. A sabre saw blade follower guide adapted for mounting on a workpiece support table having a sabre saw guideway arranged above a workpiece undergoing cutting by a portable sabre saw, the follower guide comprising a member movably and guidably attached to said table and having a leading end notch adapted to receive a sabre saw blade near the unsupported end thereof, said notch engaging the rear toothless edge of the blade to guide and stabilize the blade during its reciprocation, and means connected with said member and yieldingly biasing the member into engagement with the sabre saw blade, whereby the member follows the movement of such blade along a linear path established by a sabre saw guideway.

2. A sabre saw blade follower guide as defined in claim 1, wherein said member is a blade-like member having a top face disposed flush with the workpiece support surface of a table on which the follower guide is installed.

3. A sabre saw blade follower guide as defined in claim 1, and said means comprising a spring connected between said member and a table on which the follower guide is installed.

4. A sabre saw blade follower guide as defined in claim 2, and the blade-like member comprising an elongated thin member having a constant width and thickness and having a downturned extension at the rear end thereof, and said means comprising a retractile coil spring connected between the downturned extension and a part of a table on which the follower guide is installed, said spring lying close to the bottom of said member and extending longitudinally thereof.

5. A sabre saw blade follower guide as defined in claim 4, and a pulling knob for the follower guide attached to said downturned extension.

6. A sabre saw blade follower guide as defined in claim 1, and the leading end notch including an entrance portion having forwardly divergent edges and a rear saw blade engaging portion shaped to closely and guidingly engage the rear toothless edge of the saw blade and its side faces.

7. A sabre saw blade follower guide as defined in claim 2, and said blade-like member engaging guidably within a recessed portion of said table, a guide plate for the blade member adapted for attachment to an edge of said table in spaced relationship to said recessed portion and having a guideway means for said member, and a strap member overlying the blade-like member between said recessed portion and said guide plate and being attachable to a table on which the follower guide is installed.

8. In a saw table structure, a workpiece support surface having opening means to receive a reciprocating saw blade, an adjustable guideway means on said table for a portable saw having a reciprocating saw blade supported at only one end, and a biased saw blade follower guide on said table and having opening means adapted to receive a reciprocating saw blade therethrough near the unsupported end of such blade and following the saw blade on its movement path along the guideway means while continuously guiding and stabilizing the saw blade.

9. In a saw table structure as defined in claim 8, and said biased saw blade follower guide comprising an elongated blade-like member having a top surface arranged substantially flush with said workpiece support surface and being guidably engaged with the table structure for movement on the longitudinal axis of the blade-like member.

10. In a saw table structure as defined in claim 9, and said opening means comprising a forwardly open saw blade guiding notch in the forward end of the blade-like member and being adapted to engage the rear toothless edge and side faces of any conventional saw blade.

11. A follower guide device for the guidance and stabilization of a conventional sabre saw blade, said device adapted to be installed on substantially any saw table structure having a guideway means for a portable sabre saw, said device comprising an elongated member adapted to be guidingly engaged with a saw table structure for movement in a linear path on the longitudinal axis of the member, resilient means connected with the member and biasing it to move in one direction along said linear path, and the member having opening means formed therethrough adapted to receive a sabre saw blade and to guidingly engage the rear toothless edge and opposite sides thereof without contacting the forward toothed edge of the sabre saw blade.

* * * * *